United States Patent
Takano et al.

(10) Patent No.: US 11,378,828 B2
(45) Date of Patent: Jul. 5, 2022

(54) OPTICAL WAVEGUIDE DEVICE

(71) Applicant: SUMITOMO OSAKA CEMENT CO., LTD., Tokyo (JP)

(72) Inventors: Shingo Takano, Tokyo (JP); Yu Kataoka, Tokyo (JP); Shoutarou Hirata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/207,389

(22) Filed: Mar. 19, 2021

(65) Prior Publication Data
US 2021/0302764 A1    Sep. 30, 2021

(30) Foreign Application Priority Data
Mar. 31, 2020  (JP) .............................. JP2020-061811

(51) Int. Cl.
*G02F 1/035*  (2006.01)

(52) U.S. Cl.
CPC ........ *G02F 1/035* (2013.01); *G02F 2201/063* (2013.01)

(58) Field of Classification Search
CPC .. G02F 1/035; G02F 2201/063; G02F 1/0305; G02B 6/305; G02B 2006/1204; G02B 2006/12045; G02B 2006/12073; G02B 2006/12097; G02B 2006/12142; G02B 6/1228
See application file for complete search history.

(56) References Cited

U.S. PATENT DOCUMENTS

| | | | |
|---|---|---|---|
| 10,718,904 B2* | 7/2020 | Fathpour | G02B 6/12004 |
| 2007/0122072 A1 | 5/2007 | Kondou et al. | |
| 2009/0116802 A1 | 5/2009 | Kondou et al. | |
| 2009/0231680 A1 | 9/2009 | Yoshino | |
| 2017/0184792 A1 | 6/2017 | Courjal et al. | |
| 2018/0074259 A1 | 3/2018 | Hickey et al. | |
| 2018/0180818 A1 | 6/2018 | Jiang et al. | |

FOREIGN PATENT DOCUMENTS

| | | |
|---|---|---|
| JP | 2006-284961 A | 10/2006 |
| JP | 2007-264487 A | 10/2007 |

* cited by examiner

*Primary Examiner* — John Bedtelyon
(74) *Attorney, Agent, or Firm* — IpHorgan Ltd.

(57) ABSTRACT

An optical waveguide device including a rib-type optical waveguide 2 formed of a material having an electro-optic effect, and a reinforcing substrate 1 that supports the rib-type optical waveguide, one end of the rib-type optical waveguide 2 has a tapered portion 20, structures 4 are provided that are disposed apart from the tapered portion so as to sandwich the tapered portion and are disposed on the reinforcing substrate 1, an upper substrate is disposed above the tapered portion and the structures, and an adhesive layer is disposed in a space sandwiched between the upper substrate and the structures.

3 Claims, 5 Drawing Sheets

OPTICAL WAVEGUIDE DEVICE

CROSS-REFERENCE TO RELATED APPLICATIONS

This application claims the benefit of Japanese Patent Application No. 2020-061811 filed Mar. 31, 2020, the disclosure of which is herein incorporated by reference in its entirety.

BACKGROUND OF THE INVENTION

Field of the Invention

The present invention relates to an optical waveguide device, and more particularly to an optical waveguide device including a rib-type optical waveguide and a reinforcing substrate that supports the rib-type optical waveguide.

Description of Related Art

In the fields of optical measurement technology and optical communication technology, optical waveguide devices such as optical modulators using a substrate having an electro-optic effect are often used.

In particular, with the increase in information traffic volume in recent years, it is desired that optical communication used between cities and data centers over long distances will become faster and larger.

Further, due to the limited space of the base station, it is necessary to increase the speed and decrease the size of the optical modulator.

To reduce the size of the optical modulator, the light confinement effect can be increased by making the optical waveguide narrower, and as a result, the bending radius of the optical waveguide can be reduced and the size can be reduced. For example, lithium niobate (LN) having an electro-optic effect is used as an optical modulator for a long distance because it has less distortion and less optical loss when converting an electric signal into an optical signal. In an optical waveguide in the related art of an LN optical modulator, a mode field diameter (MFD) is about 10 μmϕ, and the bending radius of the optical waveguide is as large as several tens of mm, so that it is difficult to reduce the size.

In recent years, improved polishing technique of the substrate and bonding technique of the substrate, the LN substrate can be thinned, an MFD of the optical waveguide is being researched and developed at about 1 μmϕ. As the MFD becomes smaller, the light confinement effect also becomes larger, so that the bending radius of the optical waveguide can also be made smaller.

On the other hand, when a fine optical waveguide having an MFD smaller than 10 μmϕ, which is the MFD of an optical fiber, is used, a large insertion loss occurs when the end portion (device end face) of the optical waveguide provided in the optical waveguide device and the optical fiber are directly bonded.

In order to solve such a problem, it is conceivable to dispose a spot size conversion member (spot size converter, SSC) at the end portion of the optical waveguide. A general SSC is provided with a tapered optical waveguide portion that expands the optical waveguide in two or three dimensions. For reference, Japanese Patent Application Laid-Open No. 2006-284961 or Japanese Unexamined Patent Publication No. 2007-264487 shows an example of a tapered waveguide.

A tapered waveguide, whose spot size expands as the core portion of the optical waveguide expands, has a high degree of difficulty in adjusting the refractive indexes of the core portion and clad portion suitable for the spot size, and easily induces multi-mode propagation, so that there is a limit to the design that can be used as the SSC of the optical waveguide device. Further, to convert to the required spot size, it is necessary to form a relatively long tapered portion, which makes it difficult to miniaturize the optical waveguide device.

Further, as shown in FIGS. 5 to 7B of Japanese Patent Application Laid-Open No. 2006-284961, when a tapered waveguide having a protruding portion on the surface of the substrate is used, the manufacturing process is advanced, and when a reinforcing plate is also attached to the surface of the substrate, the presence of the protruding portion of the tapered waveguide makes it difficult to attach the reinforcing plate parallel to the surface of the substrate. When an optical fiber is directly bonded or an optical block such as a polarizer, an optical mirror, or a lens is directly bonded to the end face of a substrate, such a reinforcing plate plays an extremely important role, such as increasing the bonding area to increase the bonding strength, or suppressing the flow of an adhesive into the optical waveguide substrate side.

From the above, it has been avoided to use a tapered waveguide in which the width (including the thickness) of the optical waveguide expands toward the end face of the substrate, as the SSC of the optical waveguide device.

SUMMARY OF THE INVENTION

The problem that the present invention is to solve is to solve the above-mentioned problems, and is to provide an optical waveguide device capable of appropriately converting a spot size of light wave propagating through an optical waveguide, and appropriately bonding an optical component such as an optical block to the end face of a substrate.

In order to solve the above problems, the optical waveguide device of the present invention has the following technical features.

(1) An optical waveguide device including a rib-type optical waveguide formed of a material having an electro-optic effect, and a reinforcing substrate that supports the rib-type optical waveguide, in which one end of the rib-type optical waveguide has a tapered portion, structures are provided that are disposed apart from the tapered portion so as to sandwich the tapered portion and are disposed on the reinforcing substrate, an upper substrate is disposed above the tapered portion and the structures, and an adhesive layer is disposed in a space sandwiched between the upper substrate and the structures.

(2) In the optical waveguide device according to the above (1), a refractive index of the adhesive layer may be greater than refractive indexes of the reinforcing substrate and the upper substrate.

(3) In the optical waveguide device according to the above (1) or (2), on an extension line of the rib-type optical waveguide, an optical fiber or an optical block may be connected to end faces of the reinforcing substrate and the upper substrate.

According to the present invention, provided is an optical waveguide device including a rib-type optical waveguide formed of a material having an electro-optic effect, and a reinforcing substrate that supports the rib-type optical waveguide, in which one end of the rib-type optical waveguide has a tapered portion, structures are provided that are disposed apart from the tapered portion so as to sandwich the tapered portion and are disposed on the reinforcing substrate, an upper substrate is disposed above the tapered portion and the structures, and an adhesive layer is disposed in a space sandwiched between the upper substrate and the structures, so that it is possible to smoothly change the MFD of the light wave leaking from the tapered portion to the optical waveguide formed by the adhesive layer.

As a result, it is possible to suppress the occurrence of multi-mode propagation associated with SSC and poor connection of an optical block, or the like.

DETAILED DESCRIPTION OF THE INVENTION

Figure 1:
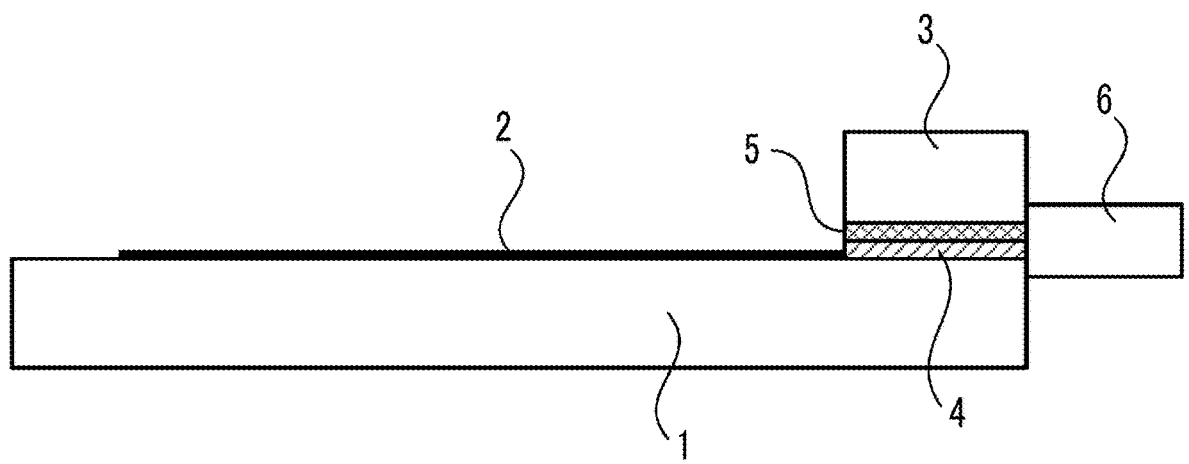
FIG. 1 is a side view of an optical waveguide device of the present invention.

Hereinafter, an optical waveguide device of the present invention will be described in detail with reference to suitable examples.

As shown in FIGS. 1 to 3C, in an optical waveguide device of the present invention including a rib-type optical waveguide 2 formed of a material having an electro-optic effect, and a reinforcing substrate 1 that supports the rib-type optical waveguide, one end of the rib-type optical waveguide 2 has a tapered portion 20 whose width narrows toward the tip, structures 4 are provided that are disposed apart from the tapered portion so as to sandwich the tapered portion and are disposed on the reinforcing substrate 1, an upper substrate 3 is disposed above the tapered portion and the structures, and an adhesive layer 5 is disposed in a space sandwiched between the upper substrate 3 and the structures.

For the material having an electro-optic effect used in the optical waveguide device of the present invention, a substrate of lithium niobate (LN), lithium tantalate (LT), lead zirconate titanate lantern (PLZT), or vapor deposition films made of these materials can be used.

Further, various materials such as semiconductor materials and organic materials can also be used as optical waveguides.

As a method of forming an optical waveguide, it is possible to use a rib-type optical waveguide having a convex portion corresponding to the optical waveguide on the substrate, by etching the substrate other than the optical waveguide, or forming grooves on both sides of the optical waveguide. Further, the refractive index can be further increased by diffusing Ti or the like on the surface of the substrate by a thermal diffusion method, a proton exchange method, or the like, along the rib-type optical waveguide.

The thickness of the substrate on which the optical waveguide is formed is set to 10 μm or less, more preferably 5 μm or less, still more preferably 1 μm or less for velocity matching between the microwave and the light wave of the modulation signal. The height of the rib-type optical waveguide is set to 4 μm or less, more preferably 2 μm or less, still more preferably 0.4 μm or less. It is also possible to form a vapor deposition film on the reinforcing substrate 1 and process the film into the shape of an optical waveguide.

The substrate on which the optical waveguide is formed is adhesively fixed to the reinforcing substrate 1 by direct bonding or via an adhesive layer such as resin in order to increase the mechanical strength. For the reinforcing substrate 1 to be directly bonded, a substrate containing a material having a refractive index lower than the refractive index of the optical waveguide or the substrate on which the optical waveguide is formed, and having a thermal expansion coefficient close to the thermal expansion coefficient of the optical waveguide, for example, an oxide layer such as crystal or glass is preferably used. A composite substrate in which a silicon oxide layer is formed on a silicon substrate abbreviated as SOI or LNOI or a silicon oxide layer is formed on an LN substrate can also be used.

Figure 2:
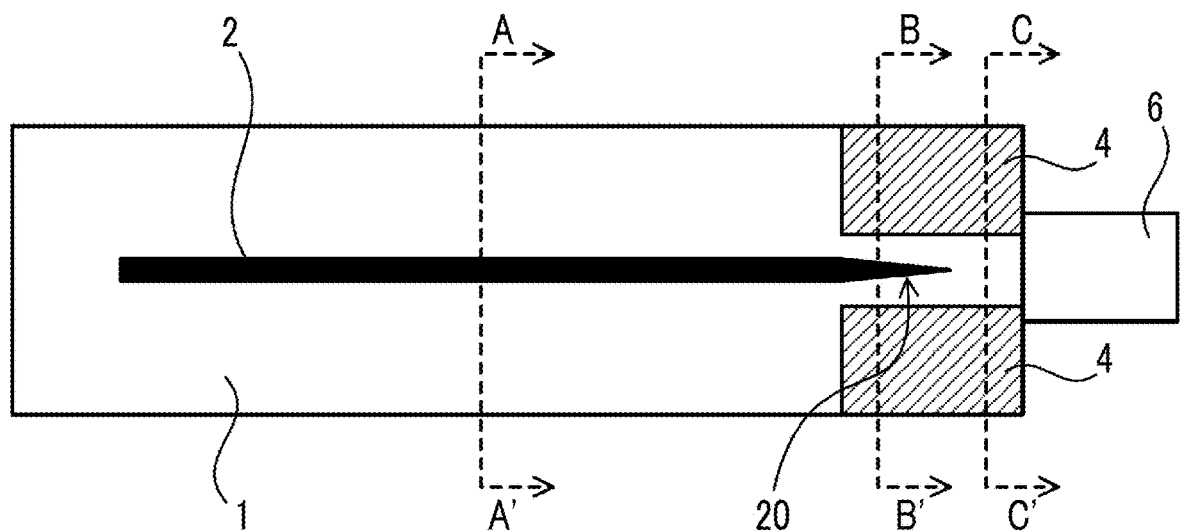
FIG. 2 is a plan view of a partial cross section of FIG. 1 as viewed from above.
Figure 3A:
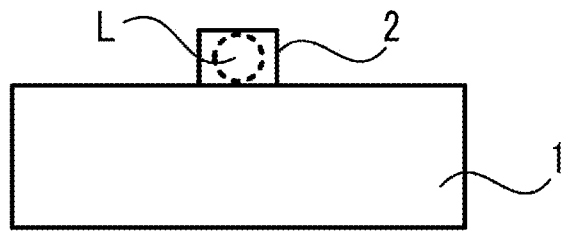
FIG. 3A is a cross-sectional view taken along a dotted line A-A' of FIG. 2.
Figure 3B:
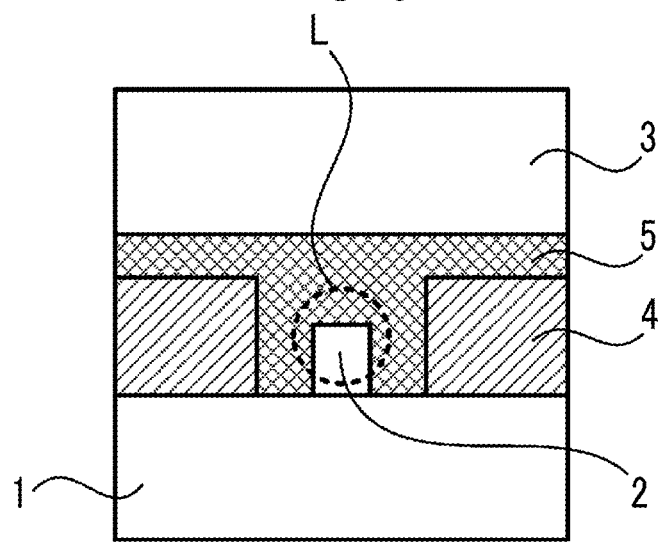
FIG. 3B is a cross-sectional view taken along a dotted line B-B' of FIG. 2.
Figure 3C:
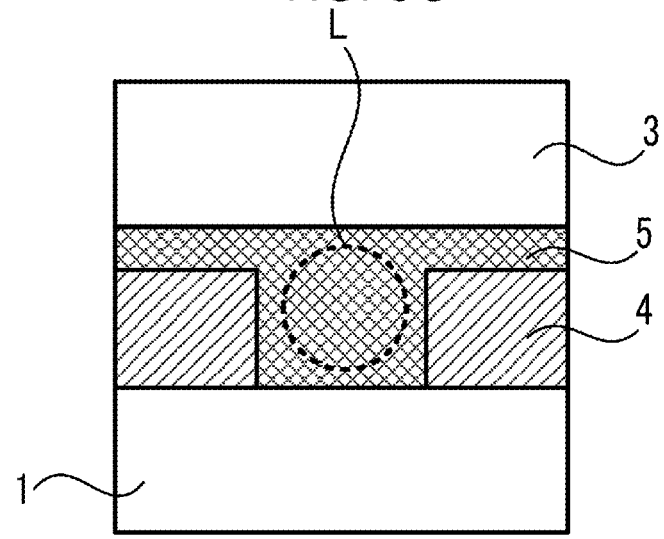
FIG. 3C is a cross-sectional view taken along a dotted line C-C' of FIG. 2.

FIGS. 1 to 3C are views for explaining an example of the optical waveguide device of the present invention, FIG. 1 is a side view, and FIG. 2 is a plan view when cut is made between the structure 4 and the adhesive layer 5 of FIG. 1 in a horizontal direction. FIG. 3A is a cross-sectional view taken along a dotted line A-A' of FIG. 2, FIG. 3B is a cross-sectional view taken along a dotted line B-B' of FIG. 2, and FIG. 3C is a cross-sectional view taken along a dotted line C-C' of FIG. 2.

A feature of the optical waveguide device of the present invention is that, as shown in FIG. 2, one end of the optical waveguide is provided with a tapered portion 20 whose width narrows toward the tip. Further, a structure 4 is provided which is disposed apart from the tapered portion 20 so as to sandwich the tapered portion 20. An ultraviolet (UV) curable resin having a refractive index similar to that of the reinforcing substrate 1 can be used for the structure 4, and the structure 4 has a lower refractive index than the adhesive layer 5. The height of the structure 4 is the same as or higher than the height of the optical waveguide 2, and the clearance between the structures 4 is also set to be at least twice the width of the optical waveguide 2. The structure 4 is a resin such as a thermoplastic resin or a thermosetting resin, of which examples include a polyamide resin, a melamine resin, a phenol resin, an amino resin, an epoxy resin, and the like, and can also include a rubber material or a silicon oxide compound as the low refractive index material. Further, the structure 4 is, for example, a permanent resist, which is a photoresist made of a thermosetting resin as a material. In the manufacturing process of the optical waveguide device, the structure 4 can be disposed by applying the structure 4 by spin coating, performing patterning by a usual general photolithography process, and then performing thermosetting. The patterning by a photolithography process can form a fine pattern shape with high accuracy as compared with the sputtering film formation in the related art, and is suitable for the embodiment of the present invention.

An upper substrate 3 is disposed on the tapered portion 20 of the optical waveguide and the upper side of the structure 4. For the upper substrate, a material having a refractive index and a linear expansion coefficient similar to those of the reinforcing substrate 1 is used. When the linear expansion coefficients match, it is possible to reduce defects such as the upper substrate coming off due to thermal stress, and a waveguide device having excellent heat resistance can be obtained. An adhesive layer 5 is obtained by filling a portion between the upper substrate 3 and the reinforcing substrate 1 with a UV curable resin so as to surround the tapered portion 20 and curing the portion. Generally used acrylic or epoxy adhesives can be used for the adhesive layer 5.

The refractive index of the adhesive layer 5 is 0.001 or more higher, as compared to the refractive indexes of the structure 4 and the reinforcing substrate 1 and the upper substrate 3. Thus, it is possible to form an optical waveguide in which the adhesive layer 5 sandwiched between the structures 4 is the core portion, and the reinforcing substrate 1, the structure 4 and the upper substrate 3 are the clad portion.

As shown in FIG. 3A, the light wave propagating through the optical waveguide 2 propagates in a single-mode along the rib-type optical waveguide 2. The dotted line L is an image of the spread of the propagating light wave.

As shown in FIG. 3B, when the width of the optical waveguide 2 becomes narrower at the tapered portion 20, the light wave L leaking from the optical waveguide 2 increases, and the MFD of the light wave spreads beyond the width of the optical waveguide 2.

As shown in FIG. 3C, in the region where the rib-type optical waveguide 2 is eliminated, the optical waveguide having an adhesive layer 5 as the core is formed, and the MFD of the light wave propagating through the core portion spreads to about the width of the core portion.

As shown in FIG. 3C, the refractive index difference between the core portion (adhesive layer 5) and the clad portion (structure 4, reinforcing substrate 1, upper substrate 3) can be appropriately adjusted according to the spread of the MFD of the light wave. Further, it is possible to propagate in a single-mode by setting an appropriate clearance between the structures 4 and the thickness of the adhesive layer 5, in addition to the above adjustment of the refractive index difference. Each design value for obtaining a desired MFD can be designed in a timely manner depending on the material to be used. For example, assuming that the refractive index of the core portion (the adhesive layer 5) is 1.54 to 1.56, the refractive index of the clad portion (the structure 4, the reinforcing substrate 1, and the upper substrate 3) is 1.45 to 1.53, and the clearance between the structures 4 and the thickness of the adhesive layer 5 are about 3 to 4 μm, the MFD of the light wave is about 3 μm and the light wave can propagate in a single-mode.

As shown in FIGS. 3A to 3C, the MFD of the light wave L is sequentially and smoothly spread by thinning the optical waveguide in a tapered shape, so that the occurrence of multi-mode propagation is suppressed in the middle. The light wave having a widened MFD as shown in FIG. 3C is input to the optical fiber 6 as shown in FIGS. 1 and 2. In the optical waveguide device of the present invention, the MFD of the rib-type optical waveguide 2 in the device is significantly smaller than the MFD of the optical fiber. However, since conversion is made such that the MFD becomes larger after the tapered portion 20 of the optical waveguide, the MFD of the light wave finally input to the optical fiber can be brought closer to the MFD of the optical fiber, and the insertion loss of the light wave can be reduced. Further, it has been reported that the SSC maintains the MFD after expansion to be greater by about 3 times as compared with the MFD before expansion, so that the conversion loss can be reduced. Optical coupling with an optical fiber is possible with low connection loss, simply by connecting SSCs in series in two stages or attaching an optical block having an optical lens, if necessary.

Further, the end face of the optical waveguide device to be directly bonded to the optical fiber 6 and the optical block is an optical waveguide in which the adhesive layer 5 is a core portion, the refractive index of the adhesive layer 5 is equal to the indexes of the clad portion of the optical fiber and the optical block, and it is not necessary to set the input angle to an angle that satisfies Snell's law, which is performed to suppress the reflection of light waves when connecting crystals. The input angle is inversely proportional to the MFD of the light wave, and in this configuration using the rib-type waveguide, the MFD is smaller, so that an input angle larger than usual is required. Therefore, since the end face of the optical waveguide device can be cut perpendicularly to the longitudinal direction of the reinforcing substrate 1, and the optical fiber or the optical block can be disposed on the extension line in the longitudinal direction, it is possible to save space and reduce the number of process steps. Further, in the present invention, the end face of the optical waveguide device is cut in the region of the dotted line C-C' in FIG. 2, but depending on the required spot size of the light wave, it is also possible to perform cutting in the region of the dotted line B-B' in FIG. 2 or the region between the dotted line B-B' in FIG. 2 and the dotted line C-C' in FIG. 2. Further, an adhesive having the same refractive index as the refractive index of the adhesive layer 5 can be used to connect the end face of the optical waveguide device to the optical fiber 6 or the optical block. Thus, even when the cut surface of the optical waveguide device has a certain degree of roughness, it is possible to significantly reduce the influence of light scattering caused by the unevenness of the cut surface by using an adhesive having the same refractive index. Therefore, it is possible to omit the optical polishing that is usually performed to prepare the cut surface, or to shorten the time, and to reduce the number of manufacturing steps of the optical waveguide device.

Further, since the upper substrate 3 is connected via the adhesive layer 5, and the optical waveguide 2 is spaced apart from the lower surface of the upper substrate 3, as in Patent Document 1, and there is no concern that the optical waveguide 2 and the upper substrate 3 come into contact with each other and the upper substrate 3 lifts up. Therefore, optical components connected to the end face of the chip substrate of the optical waveguide device, for example, optical blocks such as an optical fiber, a polarizer, and a lens, can be appropriately bonded to the end face of the substrate.

Figure 4A:
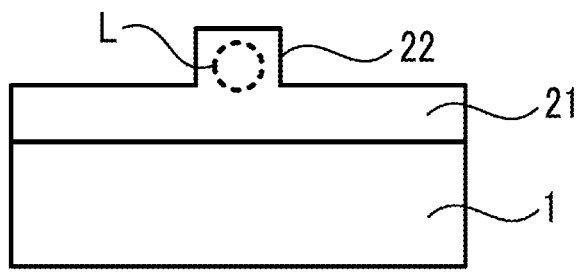
FIG. 4A is a cross-sectional view of a portion corresponding to FIG. 3A.
Figure 4B:
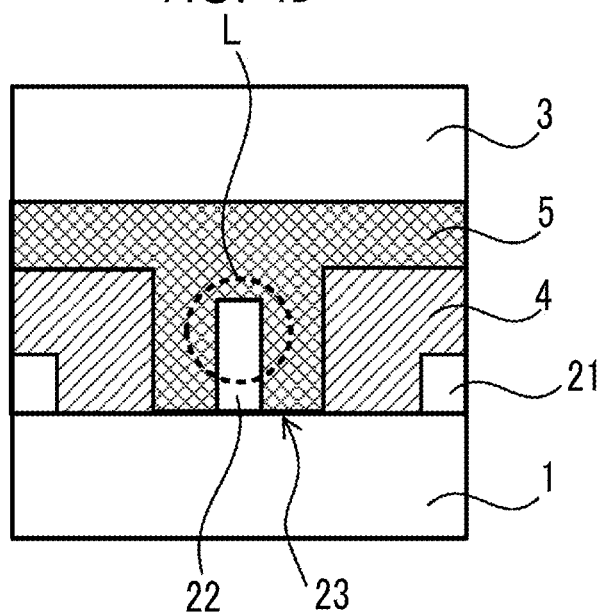
FIG. 4B is a cross-sectional view of a portion corresponding to FIG. 3B.
Figure 4C:
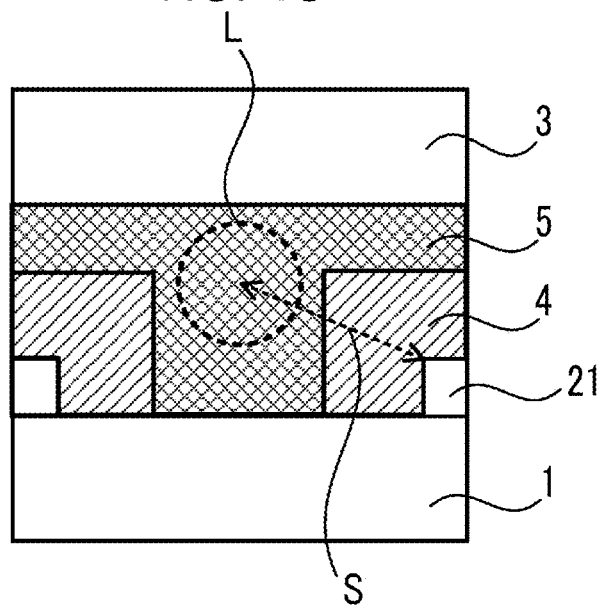
FIG. 4C is a cross-sectional view of a portion corresponding to FIG. 3C, in another embodiment according to the optical waveguide device of the present invention.

FIGS. 4A to 4C show another embodiment of the optical waveguide device of the present invention, and is a diagram illustrating a modification example of FIGS. 3A to 3C. As shown in FIG. 4A, the optical waveguide 22 is formed of a rib structure on a thinned LN substrate. In the tapered portion of the optical waveguide of FIG. 4B, the width of the optical waveguide 22 itself can be narrowed, and a part of the substrate 21 around the optical waveguide can be cut off to provide a groove 23. In this case, the width to be cut is sufficiently wider than the width of the adhesive filling portion made of the structure 4 (at least the distance S from the center of the light wave L to the surrounding substrate 21 is separated by 5 µm or more), it is necessary to prevent the propagation mode from existing in a slab portion.

As shown in FIG. 4B, the structures 4 sandwiching the optical waveguide are provided on the reinforcing substrate 1 and the substrate 21, and the adhesive layer 5 is disposed in the space sandwiched between the upper substrate 3 and the structures 4. Further, in FIG. 4C, the optical waveguide 22 itself is removed and converted into an optical waveguide having the adhesive layer 5 as a core portion.

In the present invention, the tapered portion that changes in the width direction of the optical waveguide is illustrated, but it is also possible to use a tapered portion that changes in the thickness direction or a tapered portion whose cross-sectional area changes in the width direction and the thickness direction, within the range in which the difference in refractive index between the core portion and the clad portion can be guaranteed for single-mode propagation of light waves. Further, in the present invention, different materials are disposed to adjust the refractive index of the core portion and the clad portion, but it is also possible to adjust the refractive index by using various doping agents such as fluorine and alkali metals, by ion implantation, thermal diffusion, or the like.

In order to check the effect of the optical waveguide device of the present invention, a simulation relating to the optical waveguide device has been performed as shown in FIGS. 5 to 10B.

FIGS. 5 to 7B show a model of the optical waveguide device of the present invention, in which a tapered portion is added to an optical waveguide having a width of 1 µm and the clearance between the structures 4 is set to 3 µm.

On the other hand, in FIGS. 8 to 10B, instead of the adhesive layer 5 (refractive index 1.56), a structure having a refractive index (refractive index 2.12) substantially equal to the refractive index of the optical waveguide 22 is disposed.

In this case as well, the clearance between the structures 4 is set to 3 µm.

Figure 5:
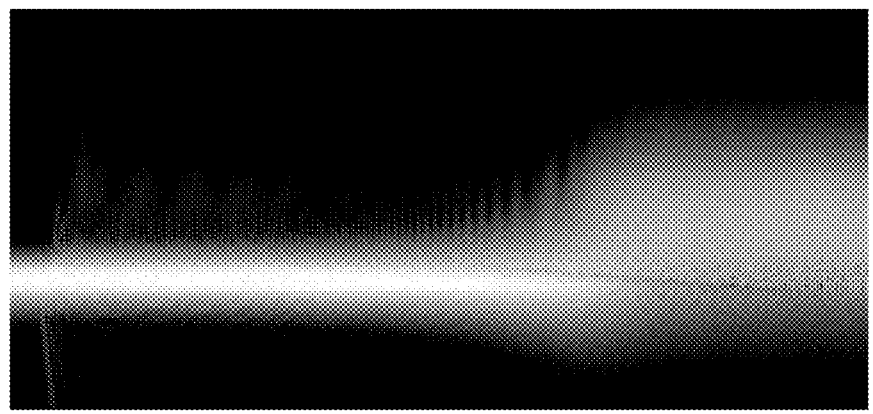
FIG. 5 is a simulation result (side view) of the optical waveguide device of the present invention.
Figure 6:
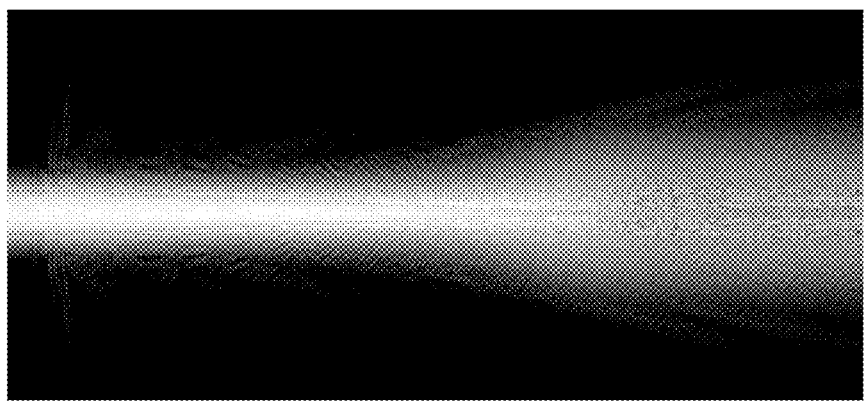
FIG. 6 is a simulation result (plan view) of the optical waveguide device of the present invention.
Figure 7A:
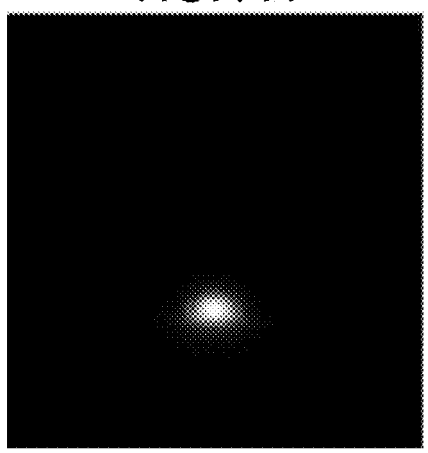
FIG. 7A is a simulation result (cross-sectional view of an input side) and FIG. 7B is a simulation result (cross-sectional view of an output side) according to the optical waveguide device of the present invention.
Figure 7B:
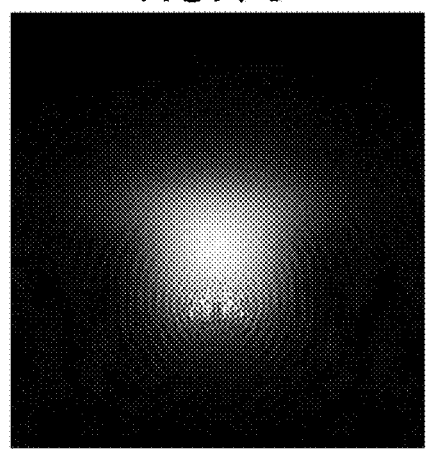
Figure 8:
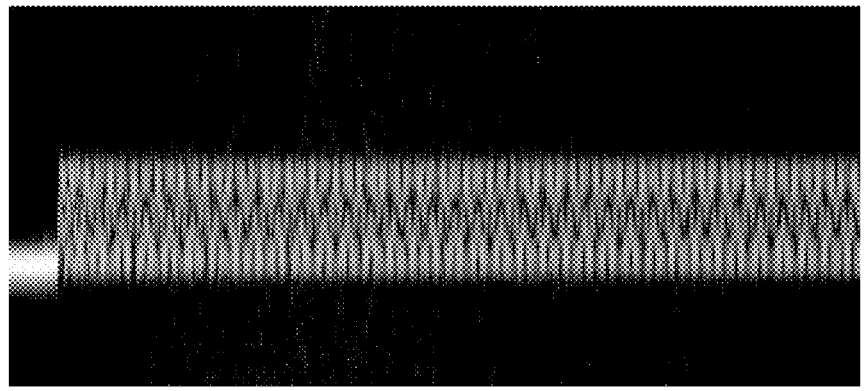
FIG. 8 is a simulation result (side view) of a comparative example according to the present invention.
Figure 9:
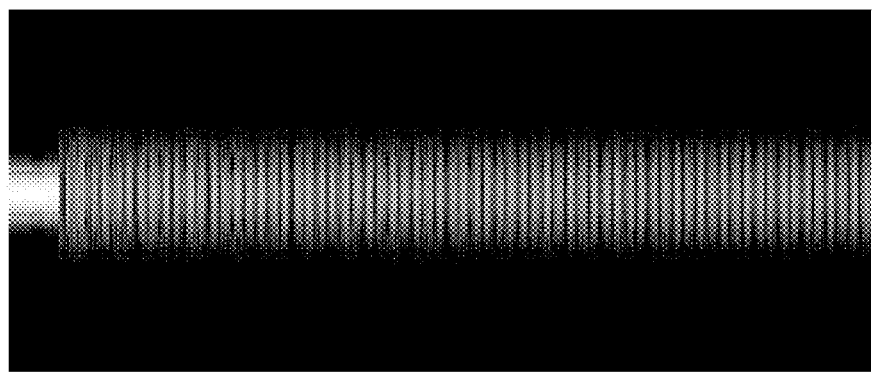
FIG. 9 is a simulation result (plan view) of a comparative example according to the present invention.
Figure 10A:
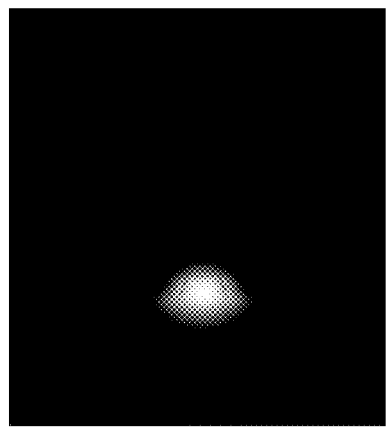
FIG. 10A is a simulation result (cross-sectional view of an input side and FIG. 10B is a simulation result (cross-sectional view of an output side) of a comparative example according to the present invention.
Figure 10B:
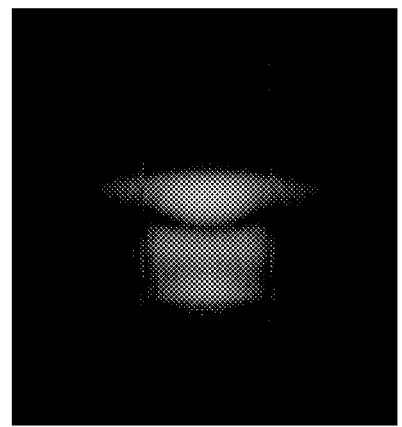

FIG. 5 is a view of the light wave propagating through the optical waveguide from the direction of FIG. 1. FIG. 6 is a view of the light wave propagating through the same optical waveguide as seen from the direction of FIG. 2. FIG. 7A is a cross section of the light wave seen from the left end of the optical waveguide of FIG. 5, and FIG. 7B is a cross section of the light wave seen from the right end of the optical waveguide of FIG. 5. FIG. 8, FIG. 9, and FIGS. 10A and 10B are diagram of comparative examples corresponding to FIG. 5, FIG. 6, and FIGS. 7A and 7B, respectively. FIGS. 8 to 10B are simple simulations of a configuration in which the MFD of the light wave is expanded by expanding the core portion of the optical waveguide with respect to FIGS. 5 to 7.

As is clear from the results of these simulations, multi-mode propagation occurs in the comparative examples of FIGS. 8 to 10B, but it is easily understood that in the optical waveguide device of the present invention, the multi-mode propagation is effectively suppressed and the MFD of the light wave is expanded with a shorter taper length.

As described above, according to the present invention, there is provided an optical waveguide device capable of appropriately converting a spot size of light wave propagating through an optical waveguide, and appropriately bonding an optical component such as an optical block to the end face of a substrate.

What is claimed is:

1. An optical waveguide device comprising:
a rib-type optical waveguide formed of a material having an electro-optic effect; and
a reinforcing substrate that supports the rib-type optical waveguide, wherein
one end of the rib-type optical waveguide has a tapered portion,
structures are provided that are disposed apart from the tapered portion so as to sandwich the tapered portion and are disposed on the reinforcing substrate,
an upper substrate is disposed above the tapered portion and the structures, and
an adhesive layer is disposed in a space sandwiched between the upper substrate and the structures.

2. The optical waveguide device according to claim 1, wherein
a refractive index of the adhesive layer is greater than refractive indexes of the reinforcing substrate and the upper substrate.

3. The optical waveguide device according to claim 1 or 2, wherein
on an extension line of the rib-type optical waveguide, an optical fiber or an optical block is connected to end faces of the reinforcing substrate and the upper substrate.

* * * * *